United States Patent [19]
Arpin et al.

[11] Patent Number: 5,560,507
[45] Date of Patent: Oct. 1, 1996

[54] REUSABLE SHIPPING CONTAINER

[75] Inventors: Gerald M. Arpin, Dudley, Mass.; Paul R. Smith, Ortonville; Douglas Johnson, Rochester Hills, both of Mich.

[73] Assignee: General Motors Corporation, Detroit, Mich.

[21] Appl. No.: 492,313

[22] Filed: Jun. 19, 1995

[51] Int. Cl.⁶ .................................................. B65D 85/48
[52] U.S. Cl. ............................... 220/1.5; 206/454; 211/41
[58] Field of Search ............................ 220/1.5; 206/448, 206/454, 523, 585; 211/41; 428/159

[56] References Cited

U.S. PATENT DOCUMENTS

| | | | |
|---|---|---|---|
| 4,320,836 | 3/1982 | Brown et al. | 206/454 |
| 4,512,473 | 4/1985 | Thomaswick et al. | 206/454 |
| 4,899,880 | 2/1990 | Carter | 206/454 |
| 4,930,634 | 6/1990 | Williams et al. | 206/454 |
| 5,145,073 | 9/1992 | Kitagawa et al. | 206/453 |
| 5,423,422 | 6/1995 | Boire et al. | 206/454 |

*Primary Examiner*—Joseph M. Moy
*Attorney, Agent, or Firm*—Patrick M. Griffin

[57] ABSTRACT

A shipping container for hanging parts, such as glass run channels, has a frame and separator assembly that hangs the parts slidably with a minimal thickness hanging and slidable separator between each adjacent part pair. Therefore, the shipping density can be made very high without mutual part damage, and the parts slide to their own shipping position. Packing and unpacking of parts is easier, since there are not precut slots or grooves into which the parts must be seated. In addition, since the frame and separator assembly are completely reusable, the surrounding sleeve can be economically made robust.

3 Claims, 5 Drawing Sheets

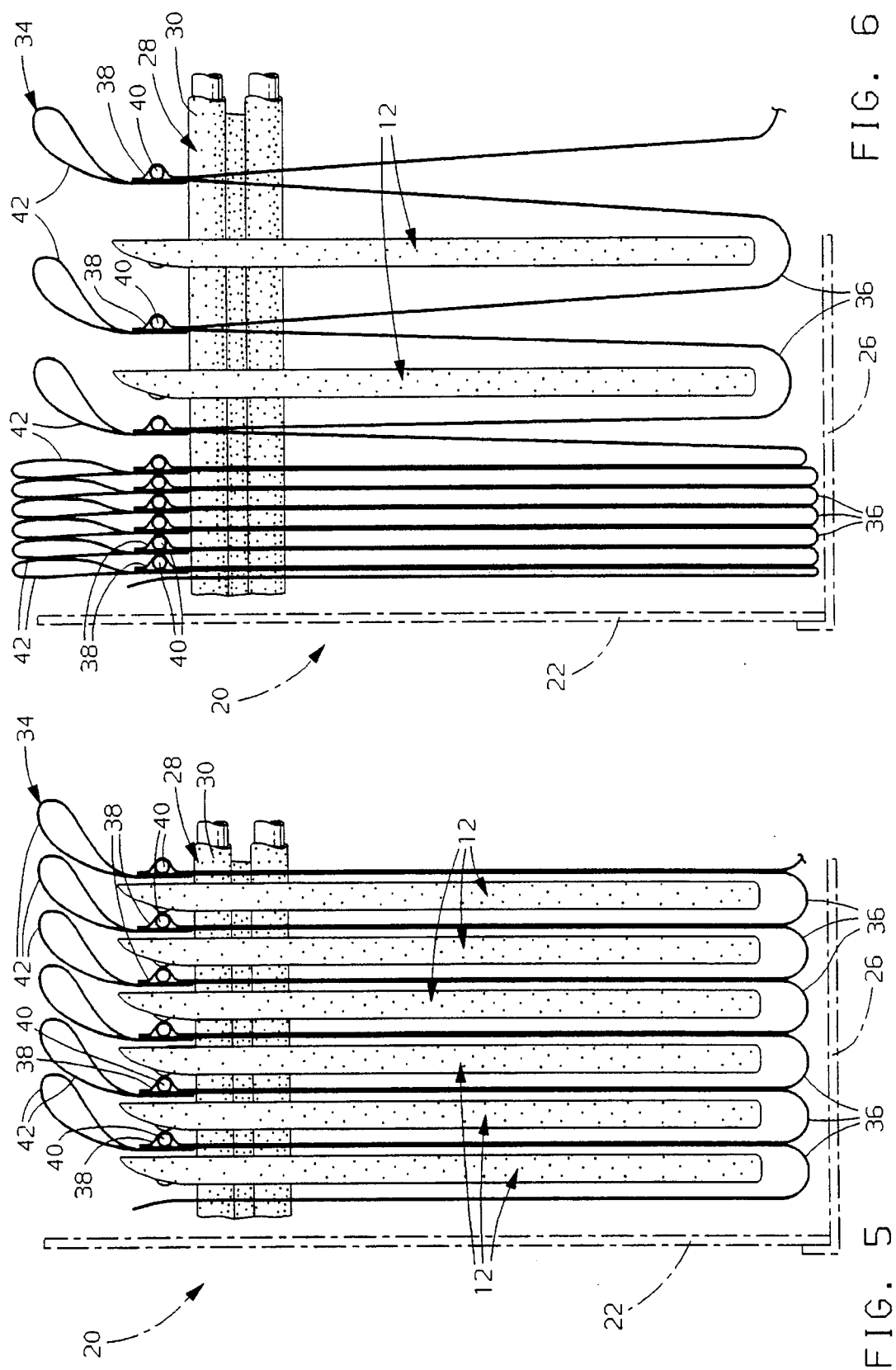

REUSABLE SHIPPING CONTAINER

This invention relates to shipping containers in general, and specifically to a shipping container for hanging parts in which the parts may be more efficiently packed and unpacked, and in which the container may be reused repeatedly with no part of the container being damaged or discarded.

BACKGROUND OF THE INVENTION

Some automotive parts, such as glass run channels, are capable of being shipped in a container in a hanging orientation, because they are generally U shaped or three sided. The channel is also substantially planar, although any or all of the three closed sides may have a significant curvature out of the plane of the part. Such a part may be inserted down into a container, open side first, until the closed side opposed to the open side hits a stop that holds the entire part in position, hanging under its own weight. While this is the most convenient shipping and handling orientation for the part, there are many drawbacks with the current containers used to ship and handle the parts, both in terms of cost, and in terms of packing and unpacking efficiency. These problems are illustrated in the drawing Figures below, in which:

Figure 1:
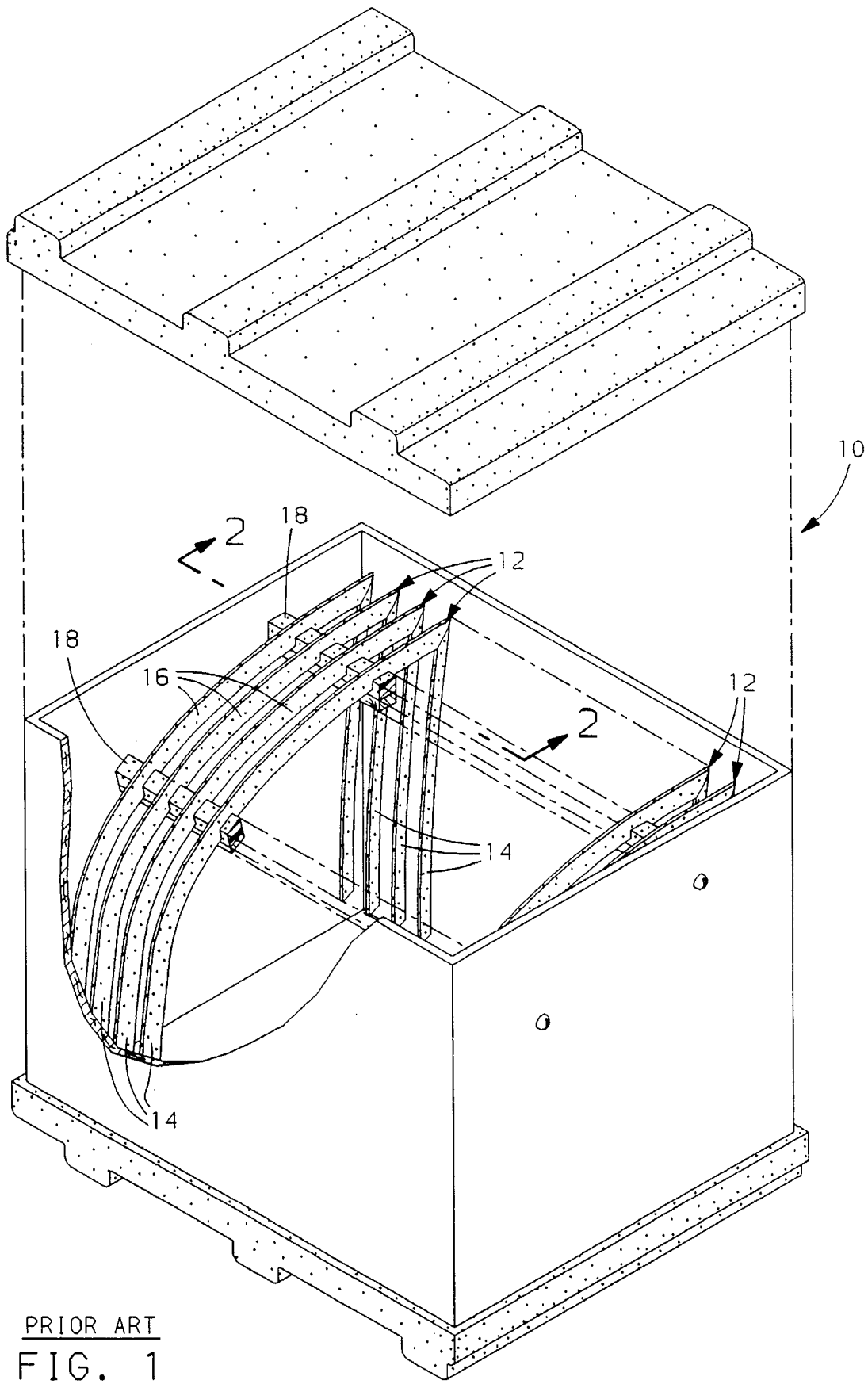
FIG. 1 is a perspective view of the current shipping container.
Figure 2:
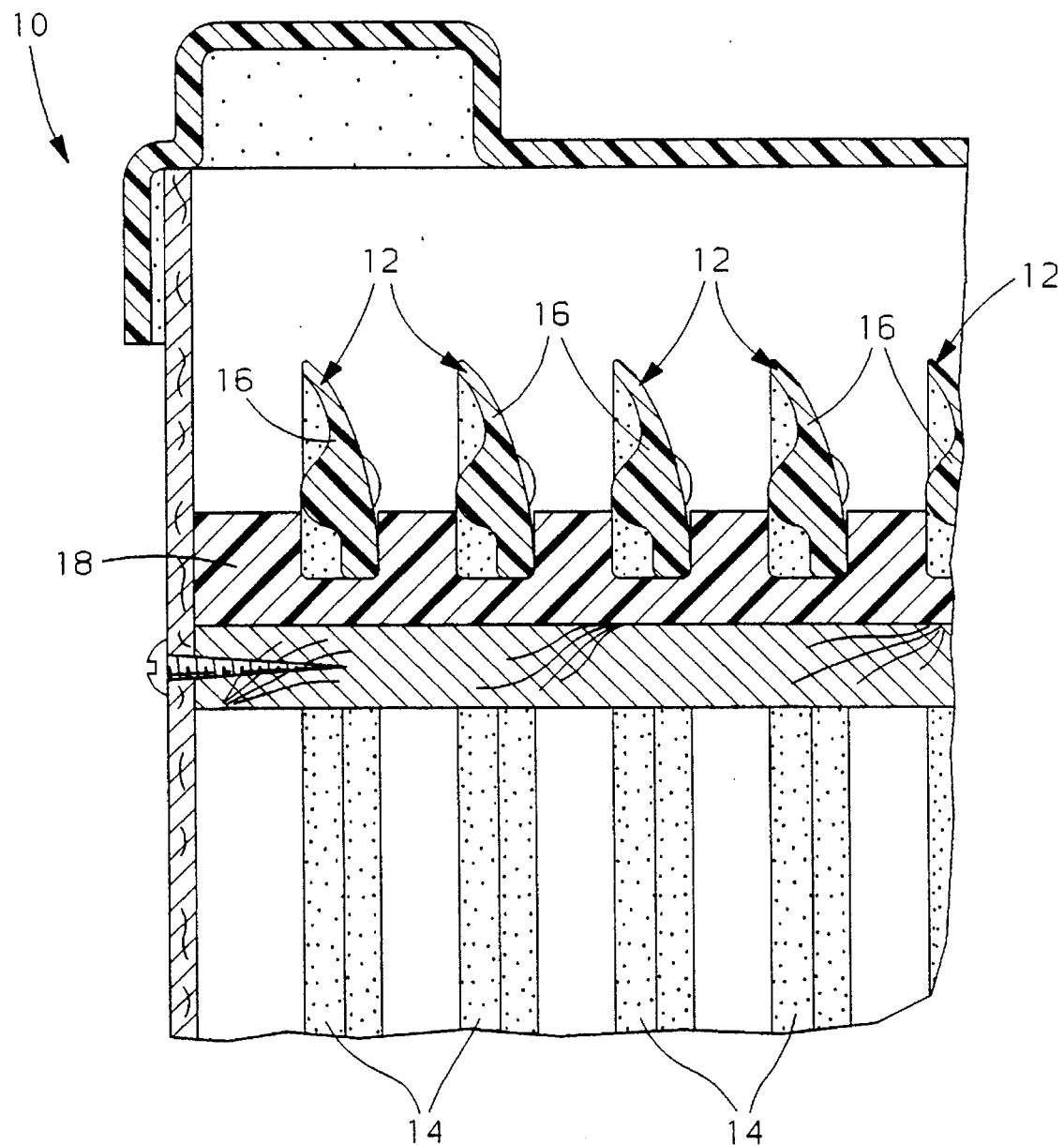
FIG. 2 is a sectional view taken along the line 2–2 of FIG. 1.

The current container 10 is shown packed with a plurality of glass run channels, indicated generally at 12. Each channel 12 is generally U or C shaped, with two side legs 14 and a top leg 16 joining the two. Within this basic configuration, any channel like 12 may vary considerably. The three closed sides may have almost any relative shape and orientation, and may be significantly curved, so that they do not lie in a plane, but occupy a considerable volume. Nevertheless, there will typically be an open side of predetermined width, and an opposed closed side like the top leg 16. This basic, open sided shape allows the part to be shipped in a hanging orientation, with the top leg 16 resting on a support and the side legs 14 hanging down under their own weight. Still, shipping parts like the channels 12 is not as simple as hanging coats on a rod, which can simply be allowed to swing back and forth, in any relative location. Unlike coats, the various surfaces of the channels 12 must be protected against jostling and mutual contact at all times: when they are packed, in the container 10, during shipping, and during unpacking when the parts are installed on the vehicle. The current system for providing shipping protection consists of a pair of slotted combs 18 running side to side across the container 10, each of which comprises a series of regular, aligned slots. Each channel 12 is packed in a container 10 by pushing the side legs 14 down until the top legs 16 pop into a pair of tight fitting, aligned slots in the combs 18. This keeps the channels 12 in a regularly spaced orientation. The combs 18, usually a resilient plastic or foam material, protect at least the channels' top legs 16, and also provide some measure of swing control to protect the hanging side legs 14 of adjacent channels 12. Each channel 12 is removed from container 10 simply by pulling it up and out of the combs 18.

Despite the almost universal use of the type of container 10 described above, it has many drawbacks, both inherent and practical. Most fundamentally, the design presents an unhappy compromise between shipping density and shipping protection. The more closely packed the parts are on the combs 18, the more likely they are to swing against one another, during packing, shipping, removal, or all three. The less densely they are packed, the more protected they are, but the costs of shipping, in terms of numbers of containers and assembly line space used, go up. Moreover, each channel 12 that is handled is just as difficult to remove from, or add to, container 10 as the previous or the next, since the packing position is not adjustable. It has also been found that the comb 18 is so likely to be damaged in use that is not practical to recycle a container like 10. The entire structure is simply scrapped after one use, with all the attendant costs and waste. This is the main reason that the obvious expedient of providing separate spacers or panels to further separate and protect the hanging side legs 14 has not been followed. More scrap costs would be incurred. In addition, shipping density would likely be reduced even more.

SUMMARY OF THE INVENTION

The invention provides a shipping container for parts, such as the glass run channels described above, which solves the problems noted above, providing improved packing density, better part protection, easier packing and unpacking, and complete reusability of the container.

In the embodiment disclosed, the container includes an internal frame assembly that provides a solid foundation structurally independent of the surrounding sleeve and lids. The frame includes a pair of slides comprised of stiff, parallel bars. The slides are smooth, with no slots, grooves other discontinuities. The slides are spaced closely enough to allow the open side of the channels to be inserted over them freely, but far enough apart to support the channel's top legs in a stable hanging orientation. The slides are long enough to support a large number of parts, and the basic design allows a larger number of parts to be supported within a given length. Slidably supported on the slides are separators in the form of folds of a continuous, pleated curtain. The curtain is a durable, but flexible material, and relatively thin. Each fold is deep and wide enough to accommodate an entire hanging channel but, being thin, occupies very little space along the length of the slides.

Each channel is packed in the container by inserting it down over the slides, into an empty fold, until its top leg hangs on the slides. There is no predetermined location for the channel on the slides, apart from being dropped into an available fold. Once hung, the channel may be simply slid down, opening up an adjacent empty fold, and so on until all folds are filled. Because there are no pre cut comb slots into which the channels must be seated, they may be much more easily packed with no more regularity in packing position than what occurs naturally as they stack up. And, since the curtain material separates the entire surface of adjacent parts, and is very thin, they can be much more densely packed without risking inter part contact at any point in the process. At the assembly line, the packing process is reversed. Even the first few channels removed from the container may be done so more easily, since they do not have to be popped out of a tight fitting comb, and since they are completely insulated from adjacent parts. And, as the container is progressively emptied, remaining parts can be fanned out and away from the others to facilitate the process. Most importantly, no part of the container is damaged, so the entire container may be reused.

The reusability of the frame and separator assembly makes it economically feasible to manufacture the surrounding sleeve from a much more robust, thicker material. The frame is strong enough to allow loads to be passed through it and between the top and bottom lids, independent of the sleeve. Therefore, the sleeve has a much longer useful life, and the containers can be stacked, making for more efficient storage and handling.

DESCRIPTION OF THE PREFERRED EMBODIMENT

Figure 3:
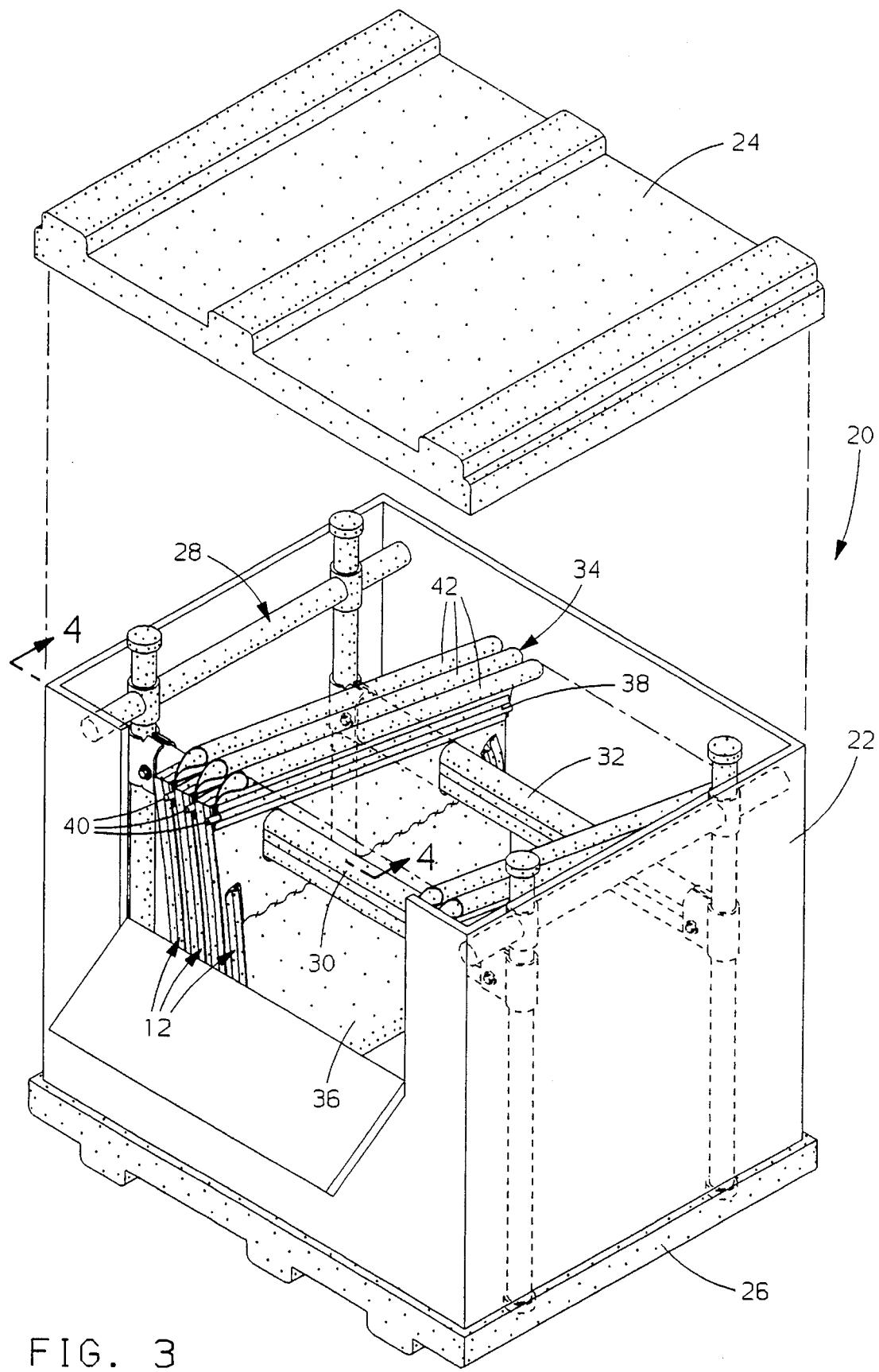
Figure 4:
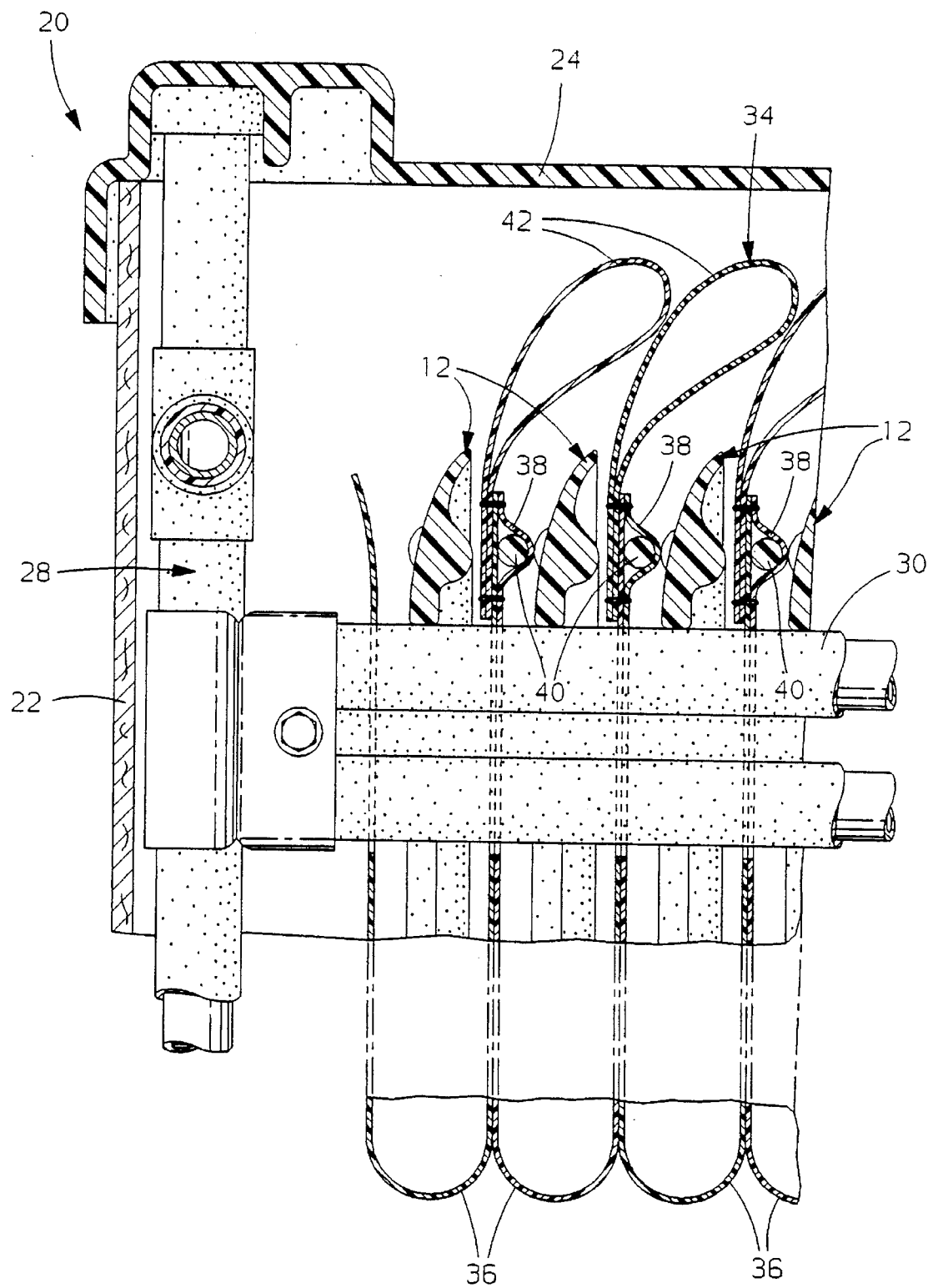

These and other features of the invention will appear from the following written description, and from the drawings, in which:

FIG. 3 is a perspective view of a preferred embodiment of the container of the invention, packed and opened, with part of its load removed to better illustrate the internal frame;

FIG. 4 is a sectional view taken along the line 4—4 of FIG. 3, but with the top lid in place;

FIG. 5 is a schematic view of just part of just one of the slides and a representative number of curtain folds, with the channels packed to full shipping density;

FIG. 6 is a view like FIG. 5, but with some of the channels and folds spread out, as they would be during packing or unloading.

Referring first to FIG. 3, a preferred embodiment of the container of the invention, indicated generally at 20, handles the same glass run channels 12 described above. Container 20 has four basic components, a surrounding box shaped sleeve 22, upper and lower lids 24 and 26, and an internal frame and separator assembly, indicated generally at 28. The internal assembly 28 comprises the guts of the container 20, and of the invention, and could, theoretically, be used alone. The sleeve 22 and lids 24 and 26 are needed to complete an enclosure, however, providing weather and contaminant exclusion, as well as a stacking feature described below. Most of the description provided relates to the internal assembly 28, however.

Referring next to FIG. 4, the frame and separator assembly 28 includes two generally parallel slides, a front slide 30 and rear slide 32, which, while they lie in a plane, do not lie in a plane that is horizontal. The front slide 30 is higher, but this is strictly a function of the shape of the channel 12. Either slide 30 or 32 could be higher, or they could lie on a horizontal plane, depending on what relative orientation will best support the channel 12 in a stable hanging position. Regardless, the slides 30 and 32 should be parallel, solidly fixed relative to each other, and long enough axially to support an adequate number of channels 12 (and they will potentially support more within a given length). They also must be spaced apart no further than the least separation of the channel's side legs 14, and, ideally, as far apart as possible within that stricture. Given this basic relationship, the slides 30 and 32 are able to support a plurality of channels 12, which are simply dropped down, the side legs 14 passing over them until the opposed top leg 16 hits and stops. The slides 30 and 32 support the entire weight of the channels 12 as they hang but do not, alone, provide mutual separation between them. It is also significant that each slide 30 and 32, regardless of total length or relative height, is smooth surfaced, with no slots or other interruptions, so that each channel 12 can be slid to any position thereon, constricted only by the presence of adjacent hanging channels 12. It should also be noted that, in the embodiment disclosed, neither end of the slides 30 and 32 is attached directly to the surrounding sleeve 22, but sits independently within sleeve 22, as part of the structurally independent assembly 28. In the embodiment disclosed, each slide 30 and 32 is a double steel tube coated by a smooth scratch protective layer.

Referring next to FIGS. 4, the function of separating the channels 12 as they hang on the slides 30 and 32 is provided by a curtain, indicated generally at 34. Curtain 34 is a heavy vinyl material, or the like, durable but thin enough to be flexible, so that it can be pleated into a continuous series of basically equal sized open folds 36, one for each channel 12. Above the slides 30 and 32, one side of each fold 36 is stiffened with a pocket 38 containing a rod 40, which generally matches the slope of the plane in which the slides 30 and 32 lie. Below the rods 40, each fold 36 is pierced on both sides so as to be slidably captured upon the slides 30 and 32. Each fold 36 is looped to the slides 30 and 32 low enough down to leave a top loop 42 long enough to flop over slightly under it's own weight. The portion of each fold 36 beneath the slides 30 and 32 hangs flat under its own weight, and is deep enough to receive a respective channel 12 without the bottom of the side legs 14 hitting the bottom of the fold 36. Each fold 36 is also slightly wider than a channel 12. Consequently, as the channels 12 rest and hang on the slides 30 and 32, they are completely physically separated by the folds 36 of curtain 34. Unlike hanging files, however, the folds 36 need provide none of the physical support for the channels 12, and they may thus be very thin, needing only enough thickness to resist piercing or scratching as channels 12 are dropped in or pulled out. Moreover, the channels 12 need not hang as far apart as before. If they should swing widely enough to hit an adjacent channel 12, they are insulated therefrom. Consequently, the packing density of the channels 12 can be made as high as the thickness of the stiffening rods 40 and the doubled thickness of the folds 36 themselves will allow. The rods 40, of course, could be replaced by wider, thinner, slats, increasing the potential packing density. As a practical matter, the packing density would not likely be taken to the theoretical maximum, and FIG. 5 does not show the channels 12 packed absolutely tightly. Doing so would make the handling of the last packed, and first removed parts more difficult.

Referring next to FIGS. 3 and 6, the packing and unpacking of channels 12 is illustrated. FIG. 3 shows upper lid 24 removed and, in addition, a flap 44 is provided in the front of sleeve 22 to ease access. During initial packing, a fold 36 may be opened wider, as shown in FIG. 6, simply by grasping the upper loop or rod 40, or both, and sliding it away from the others. This will also serve to fan out some of the trailing folds 36 automatically. Then, a channel 12 is dropped down into an open fold 36 until its top leg 16 hits and rests on the slides 30 and 32. This need not be done in any particular order, and FIG. 5 shows some central folds 36 filled, while folds 36 to the left are empty. It is likely that folds 36 would be filled in order, end to end, however, just as a matter of convenience. Once a fold 36 is filled, it and its channel 12 may be slid back to bring it closer to those already filled, if desired. As the container 20 is progressively filled, of course, each channel 12 added will have to be pushed close to the others, in order to open up folds for the addition of subsequent channels 12. However, the big advantage in packing over the old system is that the initially packed channels 12 can be very easily added, since the folds 36 can be opened very wide. Even with the finally added channels 12, there is no dedicated slot or groove that has to be found and filled. Instead, each channel 12 automatically finds its own packing position of the slides 30 and 32 which may not be, and need not be, an absolutely regular spacing. Unpacking packing and removal of packed channels 12 simply reverses the process, with the difference that it is the initial channels 12 that are the most difficult to remove. Even they, however, are easier to remove than before, since they need not be popped out of any tight fitting slots. Nor need they be lifted out so carefully as in the old container 10 since, just as during shipping, should a channel 12 swing far enough to hit an adjacent one, it is insulated by the intervening fold 36. And, as more channels 12 are unpacked, then folds 36 can be opened progressively wider, making later removals even easier. FIG. 6 also can be taken to illustrate the unpacking process, of course. Once the unpacking process is complete, it will be seen that no part of the assembly 28 or container 20 has been used up or damaged, or changed in any way. Consequently, it can simply be shipped back to its point of origin for refilling.

Referring back to FIG. 3, other advantages of the invention in terms of manufacturing flexibility may be seen and understood. The self spacing nature of the channels 12, their ability to slide freely and self stack on the slides 30 and 32, means that, potentially, other channels of differing shape can be packed in the same container 20. Therefore, one container 20 could hold parts to be used with different vehicle models on the same line, a goal of agile manufacturing. The reusability of container 20, makes it economically feasible to construct the sleeve 22 of a thicker material. The frame assembly 28 simply sits inside of sleeve 22, surrounded by and structurally independent thereof. Frame assembly 28 also sits close enough to the top lid 24 that loads on the top lid 24 may be transferred to and through the frame assembly 28 and to the bottom lid 26, independent of the sleeve. This, in turn, removes strain from the sleeve 22, and allows the containers 20 to be stacked one on top of the other. This also contributes to longer life of the sleeve 22. In addition, the frame assembly 28 can be wide enough to touch the inside of the robust sleeve 22, thereby reducing the transit and reducing sway of the frame assembly 28 within the sleeve 28. These reduces potential impact between the hanging channels 12.

Variations in the structure of the embodiment disclosed could be made while still retaining the basic advantages of the container 20. The separators between the hanging channels 12, rather than being folds 36 of a continuous curtain 34 could, instead, be separate hanging panels of a similar material and size, similarly slidably captured on the slides 30 and 32. They would do the same job of keeping the channels 12 insulated while occupying very little thickness, and would still self located between the channels 12 as they stacked up. If the material of such discrete panels were too light to hang flat, they could be anchored at the bottom with a weight. Such a design variation could be made because the functions of physically hanging the channels 12 and physically separating them are decoupled, in contrast to hanging files, where the fold must be closed at the bottom to form a supporting pocket. The continuous curtain 34 in the preferred embodiment provides the additional advantage of a closed seam at the bottom of the channels 12, however, providing almost complete encasement of the channels 12 in conjunction with the top loops 42 as they bend over the channels' top legs 16. In addition, the folds 36 inherently double the thickness of the material that insulates the adjacent pairs of channels 12, and the connection of one fold 36 to another allows several trailing folds 36 to be fanned out automatically simply by pulling one fold 36. Since the sleeve 22 is such a robust, load bearing material, it would be theoretically possible to fix the ends of the slides 30 and 32 directly to it, rather than making them part of a separate assembly 28, as disclosed. A very robust sleeve 22 could support both the slides 30 and 32, and the weight of another container 20 stacked on top. It is much simpler to provide the separate assembly 28 sitting freely on the lower lid 26, however, which would allow the sleeve 22 to be potentially lifted off completely as the assembly 28 was packed and unpacked. This also allows the slides 30 and 32 to have their height easily and quickly adjusted on the frame assembly 28, which would not be possible if the ends of the slides 30 and 32 were fixed to sleeve 22 directly. Therefore, it will be understood that it is not intended to limit the invention to just the embodiment disclosed.

We claim:

1. A reusable container for packing a plurality of parts having a generally planar, three sided configuration with at least one open side opposed to a closed side so that said part is capable of being hung by said closed side in a generally vertical orientation, said container comprising, a frame providing a solid foundation, a pair of generally parallel slides fixed to said frame and spaced closely enough to allow said parts 'open sides to pass freely therefor and spaced sufficiently far apart so as to be slidably engage said parts' closed sides and support said parts in a stable hanging orientation, said pair of slides also having sufficient length so as to support a plurality of said parts hanging in side by side relationship, and, a series of hanging separators slidably captured on said slides and having just sufficient thickness and area to insulate said parts one from another as they hang on said slides, whereby, said parts may be placed in said container by inserting their open sides down over said slides, with a respective separator located between each adjacent pair of parts, and slid along with said separators to a packing position on said slides, and later removed from said container by lifting them off of said slides and from between said separators, without discarding or removing any part of said container.

2. A reusable container for packing a plurality of parts having a generally planar, three sided configuration with at least one open side opposed to a closed side so that said part is capable of being hung by said closed side in a generally vertical orientation, said container comprising, a frame providing a solid foundation, a pair of generally parallel slides fixed to said frame and spaced closely enough to allow said parts' open sides to pass freely thereover and spaced sufficiently far apart so as to be slidably engage said part s' closed sides and support said parts in a stable hanging orientation, said pair of slides also having sufficient: length so as to support a plurality of said parts hanging in side by side relationship, and, a curtain pleated into a continuous series of folds, each fold being slidably captured on said slides and having sufficient depth to allow each of said plurality of parts hanging on said slides to be substantially completely encased by an individual fold, whereby, said parts may be placed in said container by inserting their open sides down over said slides, protected within individual curtain folds, and slid to a packing position on said slides, and later removed from said container by lifting said parts off of said slides and out of said individual folds, without discarding or removing any part of said container.

3. A reusable container for packing a plurality of parts having a generally planar, three sided configuration with at least one open side opposed to a closed side so that said part is capable of being hung by said closed side in a generally vertical orientation, said container comprising, a frame providing a solid foundation, said frame having sufficient strength to support the weight of said container, a pair of generally parallel slides fixed to said frame and spaced closely enough to allow said part's open side to pass freely thereover and spaced sufficiently far apart so as to be slidably engage said part's closed side and support said part in a stable hanging orientation, said pair of slides also having sufficient length so as to support a plurality of said parts hanging in side by side relationship, a series of hanging separators slidably captured on said slides and having just sufficient thickness and area to insulate said parts one from another as they hang on said slides, and, a structurally independent sleeve surrounding said frame and having top and bottom lids, said frame sitting on said bottom lid and resting close enough to said top lid to pass loads from said top lid to said bottom lid, whereby, said parts may be placed in said container by inserting their open sides down over said slides, with a respective separator located between each adjacent pair of parts, and slid along with said separators to a packing position on said slides, and later removed from said container by lifting them off of said slides and from between said separators, without discarding or removing any part of said container.

\* \* \* \* \*